United States Patent [19]

Freeburne et al.

[11] Patent Number: 5,194,553

[45] Date of Patent: Mar. 16, 1993

[54] PROCESS FOR PREPARATION OF ORGANOFUNCTIONAL SILOXANES

[75] Inventors: Steven K. Freeburne, Edgewood, Ky.; Charles E. Neal, Jr., Midland, Mich.; David E. Puckett, Taylor Mill; Larry H. Wood, Campbellsburg, both of Ky.

[73] Assignee: Dow Corning Corporation, Midland, Mich.

[21] Appl. No.: 879,400

[22] Filed: May 7, 1992

[51] Int. Cl.$^5$ ............................................. C08G 77/06
[52] U.S. Cl. ........................................ 528/12; 528/32; 556/467
[58] Field of Search ...................... 528/12, 32; 556/467

[56] References Cited

U.S. PATENT DOCUMENTS 2,421,653  6/1947  Sauer ................................... 260/607
2,779,776  1/1957  Hyde ................................. 260/448.2

*Primary Examiner*—Melvyn I. Marquis
*Attorney, Agent, or Firm*—William F. Boley

[57] ABSTRACT

The present invention is a process for the preparation of organofunctional-terminated polydiorganosiloxane polymers and organofunctional polydiorganosiloxane copolymers. The process comprises reacting a chlorine-terminated polydiorganosiloxane polymer with: (1) an organofunctional chlorosilane end-blocker to form an organofunctional terminated polydiorganosiloxane polymer and (2) a mixture of organochlorosilane end-blocker and organofunctional dichlorosilane to form an organofunctional polydiorganosiloxane copolymer. The process is conducted in the presence of an aqueous solution of hydrogen chloride, where the water is present in stoichiometric excess in relation to the hydrolyzable silicon-bonded chlorine.

The present process is particularly useful for producing 5-hexenyl-terminated polydimethylsiloxane polymers and for producing siloxane copolymers comprising randomly distributed poly-5-hexenylmethylsiloxy and polydimethylsiloxy blocks.

31 Claims, No Drawings

PROCESS FOR PREPARATION OF ORGANOFUNCTIONAL SILOXANES

BACKGROUND OF INVENTION

The present invention is a process for the preparation of organofunctional-terminated polydiorganosiloxane polymers and organofunctional polydiorganosiloxane copolymers. The process comprises reacting a chlorine-terminated polydiorganosiloxane polymer with: (1) an organofunctional chlorosilane end-blocker to form the organofunctional-terminated polydiorganosiloxane polymer or (2) a mixture of an organochlorosilane end-blocker and an organofunctional dichlorosilane to form a organofunctional polydiorganosiloxane copolymer. The process is conducted in the presence of an aqueous solution of hydrogen chloride, where the water is present in a stoichiometric excess in relation to the hydrolyzable silicon-bonded chlorine.

Organofunctional-terminated polydiorganosiloxane polymers and organofunctional polydiorganosiloxane copolymers, particularly where the organofunctional group is an alkenyl are finding increasing use as paper coatings. However, the use of these materials is limited by the costs of production associated with current processes. The present process is a simple one-step process using readily available materials, thus reducing the cost of production of these organofunctional siloxane polymers and siloxane copolymers.

Several methods for the production of chlorine-terminated polydiorganosiloxane polymers are known. For example, it is known that the hydrolysis and condensation of organodichlorosilanes can result in a mixture of cyclicdiorganosiloxanes and short-chained chlorine end-terminated polydiorganosiloxanes, with the concurrent formation of hydrogen chloride.

Sauer, U.S. Pat. No. 2,421,653, issued Jun. 3, 1947, teaches that polydiorganosiloxanes can be equilibrated with organodihalosilanes in the presence of an aqueous hydrogen chloride solution to form chlorine end-terminated polydiorganosiloxanes.

Hyde et al., U.S. Pat. No. 2,779,776, issued Jan. 29, 1957, teaches that polydiorganosiloxane polymers can be equilibrated in the presence of an aqueous solution of hydrogen chloride to form chlorine-terminated polydiorganosiloxanes. Furthermore, Hyde et al., teaches that the chain length of the chlorine-terminated polydiorganosiloxanes is a function of the hydrogen chloride concentration in the aqueous phase.

Typically these chlorine-terminated polydiorganosiloxane polymers are further hydrolyzed with excess water to form hydroxy-terminated polydiorganosiloxane polymers. These hydroxy-terminated siloxanes can then be condensed and end-blocked with trimethylsiloxy groups to form stable polydiorganosiloxane polymers.

In a first embodiment of the present process, a chlorine-terminated polydiorganosiloxane polymer is reacted with a organochlorosilane end-blocker containing at least one organofunctional substituent. The resultant product is an organofunctional-terminated polydiorganosiloxane polymer.

In a second embodiment of the present process, a chlorine-terminated polydiorganosiloxane polymer is reacted with a mixture comprising an organochlorosilane end-blocker and an organofunctional dichlorosilane. The resultant product is a randomly distributed block copolymer comprising diorganosiloxy blocks and organofunctionalsiloxy blocks.

The cited art does not recognize that chlorine terminated polydiorganosiloxane polymers can be reacted, as described in the present process, to form organofunctional terminated polydiorganosiloxanes and organofunctional polydiorganosiloxane copolymers.

SUMMARY OF INVENTION

The present invention is a process for the preparation of organofunctional-terminated polydiorganosiloxane polymers and organofunctional polydiorganosiloxane copolymers. The process comprises reacting a chlorine-terminated polydiorganosiloxane polymer with: (1) an organofunctional chlorosilane end-blocker to form an organofunctional terminated polydiorganosiloxane polymer or (2) a mixture of organochlorosilane end-blocker and organofunctional dichlorosilane to form an organofunctional polydiorgano-siloxane copolymer. The process is conducted in the presence of an aqueous solution of hydrogen chloride, where the water is present in stoichiometric excess in relation to the hydrolyzable silicon-bonded chlorine.

The present process is particularly useful for producing 5-hexenyl-terminated polydimethylsiloxane polymers and for producing siloxane copolymers comprising randomly distributed poly-5-hexenylmethylsiloxy and polydimethylsiloxy blocks.

DESCRIPTION OF INVENTION

The present invention is a process for the preparation of organofunctional-terminated polydiorganosiloxane polymers of formula

and organofunctional polydiorganosiloxane copolymers of formula

where each R is a radical selected from a group consisting of alkyls of one to 20 carbon atoms, cycloalkyls of four to 20 carbon atoms, and aryls; $R^1$ is an organofunctional radical selected from a group consisting of alkenyls of two to 20 carbon atoms and haloalkyls of one to 20 carbon atoms: $a=1$, 2, or 3; $b=0$, 1, or 2; $a+b=3$; $c=1$ or 2; $d=0$ or 1; $c+d=2$; $e=0$, 1, 2, or 3; $f=0$, 1, 2, or 3; $e+f=3$; x is an integer from $n+1$ to 1,000; n is an integer from one to 1,000; q is an integer from one to 1,000; y is the number of randomly distributed diorganosiloxy blocks contained in the copolymer and y is an integer from one to 1,000; and z is the number of randomly distributed organofunctionalsiloxy blocks contained in the copolymer and z is an integer from one to 1,000.

To form the organofunctional-terminated polydiorganosiloxane polymers described by formula (1), a first embodiment of the present process comprises:
(A) forming a mixture comprising chlorine-terminated polydiorganosiloxane polymers of formula

and an organofunctional chlorosilane end-blocker of formula

(B) contacting the mixture with a stoichiometric excess of water containing 5 to 36 weight percent hydrogen chloride; and (C) isolating organofunctional-terminated polydiorganosiloxane polymers described by formula (1); where R, $R^1$, a, b, and n are as previously described.

To form the organofunctional polydiorganosiloxane copolymers described by formula (2), a second embodiment of the present process comprises:

(A) forming a mixture comprising chlorine-terminated polydiorganosiloxane polymers of formula (3), that is $$Cl(R_2SiO)_nSiR_2Cl,$$

an organofunctional dichlorosilane of formula $$R^1_c R_d SiCl_2, \quad (5)$$

and an organochlorosilane end-blocker of formula $$R^1_e R_f SiCl; \quad (6)$$

(B) contacting the mixture with a stoichiometric excess of water containing 5 to 36 weight percent hydrogen chloride: and (C) isolating organofunctional polydiorganosiloxane copolymers comprising diorganosiloxy blocks of formula $(R_2SiO)_x$ and organofunctionalsiloxy blocks of formula $(R^1_c R_d SiO)_q$ randomly distributed to form organofunctional polydiorganosiloxane copolymers as described by formula (2);
where R, $R^1$, c, d, e, f, x, q, and n are as previously described.

The present process can be run in any standard reactor suitable for hydrolyzing chlorosilanes and chlorine-terminated polydiorganosiloxane polymers. The present process can be run as a continuous, semi-continuous, or batch process. The present process employs chlorine-terminated polydiorganosiloxane polymers, as described by formula (3), as the basic building unit for the process. The chlorine terminated polydiorganosiloxane polymers contain substituents R where each R is a radical independently selected from the group consisting of alkyls of one to 20 carbon atoms, cycloalkyls of four to 20 carbon atoms, and aryls. R can be, for example, methyl, ethyl, propyl, butyl, isobutyl, tert-butyl, pentyl, hexyl, cyclopentyl, cyclohexyl, phenyl, tolyl, and xylyl. Preferred is when R is methyl. More preferred is when R is methyl and n is an integer from 1 to 50.

In the embodiment of the present process where the product is an organofunctional-terminated polydiorganosiloxane polymer as described by formula (1), a mixture of the chlorine-terminated polydiorganosiloxane polymer is formed with an organofunctional chlorosilane end-blocker as described by formula (4). The organofunctional chlorosilane end-blocker can have one, two, or three organofunctional radical substituents $R^1$. $R^1$ is selected from a group consisting of alkenyls of two to 20 carbon atoms and haloalkyl radicals of one to 20 carbon atoms. $R^1$ can be, for example, vinyl, allyl, 1-methylvinyl, 4-pentenyl, 2-pentenyl, 5-hexenyl, bromomethyl, chloromethyl, iodomethyl, fluoromethyl, 3,3,3-trifluoropropyl, and perfluoropropyl. Preferred is where $R^1$ is selected from a group consisting of alkenyls of two to 10 carbon atoms. More preferred is where $R^1$ is vinyl or 5-hexenyl. The organofunctional chlorosilane end-blocker can have zero, one, or two radicals R, where R is as previously described. The preferred organofunctional chlorosilane end-blocker is one containing two substituents R, where R is methyl and $R^1$ is an alkenyl of two to 10 carbon atoms. The most preferred organofunctional chlorosilane end-blockers are 5-hexenyldimethylchlorosilane and dimethylvinylchlorosilane.

In the second embodiment of the present process where the product is an organofunctional polydiorganosiloxane copolymer as described by formula (2), a mixture of the chlorine-terminated polydiorganosiloxane polymer with an organochlorosilane end-blocker as described by formula (6) is formed. The organochlorosilane end-blocker can have zero, one, two, or three substituents $R^1$, where $R^1$ is as previously described. The organochlorosilane end-blocker can have zero, one, two, or three substituents R, where R is as previously described. The total of R substituents and $R^1$ substituents bonded to the silicon atom of the organochlorosilane end-blocker must equal three. Preferred is when the organochlorosilane end-blocker is selected from a group consisting of trimethylchlorosilane, 5-hexenyldimethylchlorosilane, and dimethylvinylchlorosilane.

A useful concentration of the organofunctional chlorosilane end-blocker of formula (4) and the organochlorosilane end-blocker of formula (6) is where the mole ratio of the chlorine-terminated polydiorganosiloxane polymer described by formula (3) to end-blocker is within a range of about 0.5 to 999. A preferred concentration for end-blocker is where the mole ratio of chlorine-terminated polydiorganosiloxane polymer to end-blocker is in a range of about 0.5 to 10.0. The mole ratio at which the chlorine terminated polydiorganosiloxane polymer and end-blocker are controlled in the mixture will depend upon the desired chain length for the product polymers and copolymers. Generally, the larger the ratio of chlorine-terminated polydiorganosiloxane polymer to end-blocker, the larger the molecular weight of the product polymers and copolymers.

In the second embodiment of the present process, where the product is an organofunctional polydiorganosiloxane copolymer as described by formula (2), the mixture of chlorine-terminated polydiorganosiloxane polymer and organochlorosilane end-blocker also contains an organofunctional dichlorosilane as described by formula (5). The organofunctional dichlorosilane can contain one or two substituents $R^1$, where $R^1$ is an organofunctional radical as previously described; and zero or one substituent R, where R is as previously described. The preferred organofunctional dichlorosilane is where $R^1$ is an alkenyl of two to 10 carbon atoms and R is methyl. Even more preferred is when the organofunctional dichlorosilane is 5-hexenylmethyldichlorosilane or methylvinyldichlorosilane.

A useful concentration of the organofunctional dichlorosilane, as described by formula (5), is where the mole ratio of the chlorine-terminated polydiorganosiloxane polymers described by formula (1), to organofunctional dichlorosilane, is within a range of about 0.5 to 1000. It is preferred that the mole ratio of chlorine-terminated polydiorganosiloxane polymer to organofunctional dichlorosilane be within a range of about 0.5 to 5.0.

The mixture comprising either (1) the chlorine terminated polydiorganosiloxane polymer and the organofunctional chlorosilane end-blocker: or (2) the chlorine-terminated polydiorganosiloxane polymer, the organofunctional dichlorosilane, and the organochlorosilane end-blocker; is contacted with a stoichiometric excess of water containing 5 to 36 weight percent hydrogen chloride.

The described mixtures are immiscible with the aqueous hydrogen chloride. Therefore, it is desirable to facilitate contact between the mixture phase and the aqueous phase by a dispersive means. The dispersive means can be, for example, mechanical stirring, sonification, agitation of the reactor, high pressure injection, or impingement mixing.

The mixtures are contacted with a stoichiometric excess of water. By "stoichiometric excess" it is meant that the mole ratio of water to total silicon-bonded chlorine is greater than 0.5. Generally, the greater the excess of water the faster the reaction, however, excess water may cause formation of cyclosiloxanes. Therefore, in practice, the mole ratio of water to silicon-bonded chloride is dictated by the size of the reaction vessel, desired reaction rate, and acceptable levels of cyclosiloxanes. A useful mole ratio of water to silicon-bonded chlorine is within a range of greater than about 0.5 to 200. A preferred mole ratio of water to silicon-bonded chlorine is within a range of about one to 100. The most preferred molar ratio of water to silicon-bonded chloride is within a range of about 4 to 40.

Hydrogen chloride, present in aqueous solution, acts as a catalyst for the present process. Therefore, it is desirable to maintain the aqueous concentration of hydrogen chloride in the present process within a range of about 5 to 36 weight percent. The water added to the process may contain 5 to 36 weight percent hydrogen chloride as added or alternatively water may be added to the process and the 5 to 36 weight percent hydrogen chloride be provided by the hydrolysis of silicon-bonded chlorine. A preferred range for the concentration of hydrogen chloride in water is about 10 to 32 weight percent. The most preferred range for the concentration of hydrogen chloride in water is about 25 to 32 weight percent.

The temperature at which the process is conducted can be any temperature within a range where the lower limit is defined by the freezing point of the aqueous hydrogen chloride solution and the upper limit determined by the point where significant cleavage of organic substituents from silicon occurs. In general, a temperature within a range of about 0° C. to 100° C. may be used. A preferred temperature for conducting the process is within a range of about 20° C. to 50° C.

The pressure within the reactor in which the process is run can be within a range of about 0.1 to ten atmospheres. About one atmosphere is a preferred pressure.

The time of contact of the mixtures with the aqueous hydrogen chloride is not critical to the present process. In general, any contact time within a range of about 0.1 hour to 18 hours is considered useful. A preferred contact time is within a range of about 0.5 hour to four hours.

Isolation of the organofunctional-terminated polydiorganosiloxane polymers and isolation of the organofunctional polydiorganosiloxane copolymers can be achieved by standard means. The siloxane polymers and the siloxane copolymers can be separated from the aqueous hydrogen chloride by, for example, stripping, gravitational settling, centrifugation, coalescence, or membrane separation.

Typically the recovered product siloxane polymers and product siloxane copolymers are contaminated with materials containing silicon-bonded to chlorine. To ensure the stability of the recovered products, it is desirable to wash the recovered products with one or more portions of water to hydrolyze and remove the residual chlorine.

The following examples are offered to illustrate the present invention. These examples are not intended to limit the present claims.

EXAMPLE 1

A 5-hexenyl-terminated polydimethylsiloxane polymer was prepared. The preparation apparatus was a one-liter, three-necked flask, containing a bottom drain. The flask was fitted with a thermometer and an externally driven stirring blade. A charge of 500 g Cl(Me$_2$SiO)$_n$SiMe$_2$Cl (where n is an average value of 37.7), 24 g of 5-hexenyldimethylchlorosilane, and 72 g of 8.4 weight percent (Wt %) aqueous hydrogen chloride was placed in the flask. The content of the flask was stirred for one hour at 25° C.

At the end of one hour, stirring was stopped and the content of the flask allowed to separate. The bottom aqueous acid layer was drained off. An additional 170 g of water was added to the siloxane polymers remaining in the flask, to hydrolyze the residual silicon-bonded chlorine and effect chlorine removal. The resulting dispersion was heated to about 120° C. to remove the water. The siloxane polymers were washed with two, 30 g, portions of water. The resulting siloxane polymers were heated to 155° C. at about 20 mmHg to remove volatile species. The product was analyzed for residual chlorine by acid/base titration, for vinyl content by Fourier Transform Infrared (FTIR) analysis, and the viscosity determined. The product contained 3.5 ppm chlorine, 0.68 weight percent (Wt %) vinyl, and had a viscosity of about 290 cs.

EXAMPLE 2

A 5-hexenyl-terminated polydimethylsiloxane polymer was prepared. The procedure was similar to that described for Example 1. A charge of 300 g of Cl(Me$_2$SiO)$_n$SiMe$_2$Cl (where n is an average value of 37.7), 7.1 g of 5-hexenyldimethylchlorosilane, and 43 g of 11.1 Wt % aqueous hydrogen chloride was placed in the flask. The content of the flask was stirred vigorously for one hour at 25° C. The resultant product was separated, washed, and analyzed as described for Example 1. The product contained 17.6 ppm chlorine, 0.33 Wt % vinyl, and had a viscosity of 682 cs.

EXAMPLE 3

A 5-hexenylfunctional polydimethylsiloxane copolymer was prepared. The apparatus was the same as described for Example 1. A charge of 500 g of Cl(Me$_2$SiO)$_n$SiMe$_2$Cl (Where n is an average value of 37.7), 27 g of 5-hexenylmethyldichlorosilane, 16.1 g of 5-hexenyldimethylchlorosilane, and 85 g of a 3.6 Wt % aqueous hydrogen chloride solution was placed in the flask. The content of the flask was stirred vigorously for one hour at 25° C. The resultant product siloxane copolymers were washed with 105 g of water, followed by five additional washings with 50 g portions of water. The washed product was stripped of volatiles and analyzed as described in Example 1. The product contained 27.9 ppm chlorine, 1.03 Wt % vinyl, and had a viscosity of 238 cs.

EXAMPLE 4

A 5-hexenylfunctional polydimethylsiloxane copolymer was prepared. The apparatus was the same as described for Example 1. A charge of 1386 g of Cl(Me$_2$SiO)$_n$SiMe$_2$Cl (where n is an average value of 37.7), 71.6 g of 5-hexenylmethyldichlorosilane, and 42.9 g of 5-hexenyldimethylchlorosilane was added to the flask and mixed for 10 minutes. Then, 300 g of a 25 Wt % aqueous hydrogen chloride solution was added to the flask and mixing continued for an additional five minutes. After five minutes, 300 g of water was added to the flask and stirring continued for about three hours at 25° C. The resultant product was separated, washed, stripped, and analyzed as described in Example 1. The product contained 3 ppm chlorine, 0.84 Wt % vinyl, and had a viscosity of 369 cs. The product contained 119 ppm SiOH, as determined by FTIR analysis after substituting deuterium for hydrogen in the SiOH.

What is claimed is:

1. A process for preparation of organofunctional terminated polydiorganosiloxane polymers, the process comprising:
   (A) forming a mixture comprising a chlorine-terminated polydiorganosiloxane polymer of formula $$Cl(R_2SiO)_nSiR_2Cl,$$

where each R is a radical independently selected from a group consisting of alkyls of one to 20 carbon atoms, cycloalkyls of 4 to 20 carbon atoms, and aryls, and n is an integer from one to 1,000; and an organofunctional chlorosilane end-blocker of formula $$R^1_aR_bSiCl,$$

where R$^1$ is an organofunctional radical selected from the group consisting of alkenyls of two to 20 carbon atoms and haloalkyl radicals of one to 20 carbon atoms, R is as previously described, a=1, 2, or 3, b=0, 1, or 2, and a+b=3;
   (B) contacting the mixture with a stoichiometric excess of water containing 5 to 36 weight percent hydrogen chloride; and
   (C) isolating organofunctional-terminated polydiorganosiloxane polymers of formula $$R^1_aR_bSiO(R_2SiO)_xSiR^1_aR_b,$$

where R, R$^1$, a, and b are as previously described and x is an integer from n+1 to 1,000.

2. A process according to claim 1, where R is methyl.

3. A process according to claim 1, where n is an integer from 1 to 50.

4. A process according to claim 1, where R$^1$ is selected from a group consisting of alkenyls of two to 10 carbon atoms.

5. A process according to claim 1, where R$^1$ is selected from a group consisting of vinyl and 5-hexenyl.

6. A process according to claim 1, where the organofunctional chlorosilane end-blocker is selected from a group consisting of 5-hexenyldimethylchlorosilane and dimethylvinylchlorosilane.

7. A process according to claim 1, where the mole ratio of the chlorine-terminated polydiorganosiloxane polymer to the organofunctional chlorosilane end-blocker is within a range of about 0.5 to 10.0.

8. A process according to claim 1, where the mole ratio of the water to silicon-bonded chlorine is within a range of greater than about 0.5 to 200.

9. A process according to claim 1, where the mole ratio of the water to silicon-bonded chlorine is within a range of about 4 to 40.

10. A process according to claim 1, where the water contains about 25 to 32 weight percent hydrogen chloride.

11. A process according to claim 1, where the process is conducted at a temperature within a range of about 20° C. to 50° C.

12. A process according to claim 1, where contact of the mixture with the stoichiometric excess of water containing 5 to 36 weight percent hydrogen chloride is for a time period within a range of about 0.1 to 18 hours.

13. A process according to claim 1, where contact of the mixture with the stoichiometric excess of water containing 5 to 36 weight percent hydrogen chloride is for a time period within a range of about 0.5 to four hours.

14. A process according to claim 1, where the isolated organofunctional-terminated polydiorganosiloxane polymers are washed with one or more portions of water.

15. A process for preparation of organofunctional polydiorganosiloxane copolymers, the process comprising:
   (A) forming a mixture comprising a chlorine-terminated polydiorganosiloxane polymer of formula $$Cl(R_2SiO)_nSiR_2Cl,$$

where each R is a radical independently selected from a group consisting of alkyls of one to 20 carbon atoms, cycloalkyls of four to 20 carbon atoms, and aryls, and n is an integer from one to 1,000; an organofunctional dichlorosilane of formula $$R^1_cR_dSiCl_2,$$

where R$^1$ is an organofunctional radical selected from a group consisting of alkenyls of two to 20 carbon atoms and haloalkyls of one to 20 carbon atoms, R is as previously described, c=1 or 2, d=0 or 1, and c+d=2; and an organochlorosilane end-blocker of formula $$R^1_eR_fSiCl,$$

where R and R$^1$ are as previously described, e=0, 1, 2, or 3, f=0, 1, 2, or 3, and e+f=3;
   (B) contacting the mixture with a stoichiometric excess of water containing 5 to 36 weight percent hydrogen chloride; and
   (C) isolating organofunctional polydiorganosiloxane copolymers comprising diorganosiloxy blocks of formula (R$_2$SiO)$_x$ and organofunctionalsiloxy blocks of formula (R$^1_c$R$_d$SiO)$_q$ randomly distributed to form organofunctional polydiorganosiloxane copolymers of formula $$R^1_eR_fSiO\{(R_2SiO)_x\}_y\{(R^1_cR_dSiO)_q\}_zSiR^1_eR_f,$$

where R, R$^1$, c, d, e, and f are as previously described, x is an integer from n+1 to 1,000, q is an integer from one to 1,000, y is the number of randomly distributed diorganosiloxy blocks contained in the copolymer and y is an integer from one to 1,000, and z is the number of randomly distributed organofunctionalsiloxy blocks contained in the copolymer and z is an integer from one to 1,000.

16. A process according to claim 15, where R is methyl.

17. A process according to claim 15, where n is an integer from 1 to 50.

18. A process according to claim 15, where $R^1$ is selected from a group consisting of alkenyls of two to 10 carbon atoms.

19. A process according to claim 15, where $R^1$ is selected from a group consisting of vinyl and 5-hexenyl.

20. A process according to claim 15, where the organochlorosilane end-blocker is selected from a group consisting of 5-hexenyldimethylchlorosilane, dimethylvinylchlorosilane, and trimethylchlorosilane.

21. A process according to claim 15, where the mole ratio of the chlorine-terminated polydiorganosiloxane polymer to the organofunctional chlorosilane end-blocker is in a range of about 0.5 to 10.0.

22. A process according to claim 15, where the mole ratio of the water to silicon-bonded chlorine is within a range of greater than about 0.5 to 200.

23. A process according to claim 15, where the mole ratio of the water to silicon-bonded chlorine is within a range of about 4 to 40.

24. A process according to claim 15, where the water contains about 25 to 32 weight percent hydrogen chloride.

25. A process according to claim 15, where the process is conducted at a temperature within a range of about 20° C. to 50° C.

26. A process according to claim 15, where contact of the mixture with the stoichiometric excess of water containing 5 to 36 weight percent hydrogen chloride is for a time period within a range of about 0.1 to 18 hours.

27. A process according to claim 15, where contact of the mixture with the stoichiometric excess of water containing 5 to 36 weight percent hydrogen chloride is for a time period within a range of about 0.5 to four hours.

28. A process according to claim 15, where the isolated organofunctional polydiorganosiloxane copolymers are washed with one or more portions of water.

29. A process according to claim 15, where the mole ratio of the chlorine-terminated polydiorganosiloxane to organofunctional dichlorosilane is within a range of about 0.5 to 5.0.

30. A process according to claim 1, where R is methyl, n=1 to 50, the stoichiometric excess of water contains 25 to 32 weight percent hydrogen chloride, the mole ratio of water to silicon-bonded chlorine is within a range of about 4 to 40, the organofunctional chlorosilane end-blocker is selected from a group consisting of 5-hexenyldimethylchlorosilane, and dimethylvinylchlorosilane, the mole ratio of chlorine-terminated polydiorganosiloxane polymer to the organofunctional chlorosilane end-blocker is within a range of about 0.5 to 10, and the process is conducted at a temperature within a range of about 20° C. to 50° C.

31. A process according to claim 15, where R is methyl, n=1 to 50, The stoichiometric excess of water contains 25 to 32 weight percent hydrogen chloride, the mole ratio of water to silicon-bonded chlorine is within a range of about 4 to 40, the organochlorosilane end-blocker is selected from a group consisting of 5-hexenyldimethylchlorosilane, dimethylvinylchlorosilane, and trimethylchlorosilane, the mole ratio of chlorine-terminated polydiorganosiloxane polymer to the organochlorosilane end-blocker is within a range of about 0.5 to 10, and the process is conducted at a temperature within a range of about 20° C. to 50° C.

* * * * *